(12) United States Patent
Skjetne et al.

(10) Patent No.: US 7,467,051 B2
(45) Date of Patent: Dec. 16, 2008

(54) METHOD AND A SYSTEM FOR TESTING OF A POWER MANAGEMENT SYSTEM OF A MARINE VESSEL

(75) Inventors: Roger Skjetne, Ranheim (NO); Thor Arne Johansen, Vikhamer (NO); Asgeir Johan Sørensen, Trondheim (NO)

(73) Assignee: Marine Cybernetics AS, Tiller (NO)

(*) Notice: Subject to any disclaimer, the term of this patent is extended or adjusted under 35 U.S.C. 154(b) by 59 days.

(21) Appl. No.: 11/566,917

(22) Filed: Dec. 5, 2006

(65) Prior Publication Data

US 2007/0143090 A1  Jun. 21, 2007

(30) Foreign Application Priority Data

Dec. 7, 2005  (NO) ................................ 20055813

(51) Int. Cl.
G06F 19/00 (2006.01)
G01R 19/00 (2006.01)

(52) U.S. Cl. ................ 702/64; 702/117; 702/120; 701/21; 703/14; 703/18; 700/295; 700/306

(58) Field of Classification Search ............... 702/57, 702/60, 64, 117; 701/21; 703/14, 18; 700/295, 700/297, 306

See application file for complete search history.

(56) References Cited

U.S. PATENT DOCUMENTS 4,301,760 A  11/1981  Cassone et al.

(Continued)

FOREIGN PATENT DOCUMENTS

EP  1168121 A2  1/2002

(Continued)

OTHER PUBLICATIONS

Monti, A, et al., "Ship Power System Control: A Technology Assessment," IEEE Electric Ship Technologies Symposium, pp. 292-297 (2005).

(Continued)

Primary Examiner—Edward Raymond
Assistant Examiner—Elias Desta
(74) Attorney, Agent, or Firm—Rothwell, Figg, Ernst & Manbeck, PC

(57) ABSTRACT

Herein disclosed is a system for testing a power management system (2) of a marine vessel (1), in which said power management system (2) is arranged for controlling systems (6) that produce electrical energy, in which said power management system (2) is arranged for receiving first signals (9) from a power consuming system (7). As a response to said first signals (9) said power management system (2) is arranged for furnishing second control signals (10) to a power generation system (6) arranged for furnishing power (P) to said power consuming system (7) and/or to one or more electrical power distribution grid (90),
characterized by
a simulator (120) arranged for being connected to said power management system (2), said simulator (120) including
a simulated power consuming system (7') arranged for receiving real and/or simulated control signals (8, 8') pertaining to a desired state of said simulated power consuming system (7'),
a simulated power generation module (6') arranged for furnishing simulated power (P') to said simulated power consuming system (7'),
said simulated power consuming system (7') arranged for furnishing simulated signals (9') to said real power management system (2),
said real power management system (2) arranged for furnishing control signals (10) to said simulated power generation system (6') as a response to said simulated signals (9'),
said simulated power generation system (6') arranged for providing simulated power (P') to said simulated power consuming system (7') as a response to said control signals (10),
for the functional testing and/or failure mode testing of said power management system (2) under said simulated signals (9').

55 Claims, 13 Drawing Sheets

Detailed power plant view with distributed PMS

U.S. PATENT DOCUMENTS

| | | | |
|---|---|---|---|
| 5,023,791 A | 6/1991 | Herzberg et al. | |
| 5,214,582 A | 5/1993 | Gray | |
| 5,260,874 A | 11/1993 | Berner et al. | |
| 5,523,951 A | 6/1996 | Kriesgman et al. | |
| 5,541,863 A | 7/1996 | Magor et al. | |
| 6,298,318 B1 | 10/2001 | Lin | |
| 6,450,112 B1 | 9/2002 | Deghuee | |
| 6,505,574 B1 | 1/2003 | Naud et al. | |
| 6,526,356 B1 | 2/2003 | DiMaggio et al. | |
| 6,847,872 B2 | 1/2005 | Bodin et al. | |
| 6,980,944 B1 * | 12/2005 | Oshins et al. | 703/17 |
| 7,177,734 B2 | 2/2007 | Fossen et al. | |
| 2003/0139916 A1 | 7/2003 | Choe et al. | |

FOREIGN PATENT DOCUMENTS

| | | |
|---|---|---|
| JP | 57020811 | 2/1982 |
| JP | 59091510 | 5/1984 |
| NO | 20010397 | 7/2002 |
| NO | 318712 B1 | 5/2005 |
| SU | 508713 A | 5/1976 |
| WO | 9214216 A1 | 8/1992 |
| WO | 0073815 A1 | 12/2000 |
| WO | 02058989 A1 | 8/2002 |
| WO | 03093913 A1 | 11/2003 |
| WO | 2004059411 A1 | 7/2004 |
| WO | 2005121915 A1 | 12/2005 |

OTHER PUBLICATIONS

International Search Report for PCT/NO2006/000455 (6 pages) (Mar. 29, 2007).

Written Opinion of the International Searching Authority for PCT/NO2006/000455 (7pages) (Mar. 29, 2007).

Norwegian Search Report in NO 2005 5813 (1 page) (Jun. 7, 2006).

Office Action for Norwegian Application No. NO 2002 6284 (3 pages) (Jun. 30, 2003).

Office Action for Norwegian Application No. NO 2003 5861 (4 pages) (Aug. 3, 2004).

Office Action for Norwegian Application No. NO 2002 6284 (4pages) (Oct. 27, 2004).

Office Action for Norwegian Application No. NO 2004 5039 (5 pages) (May 19, 2005).

* cited by examiner

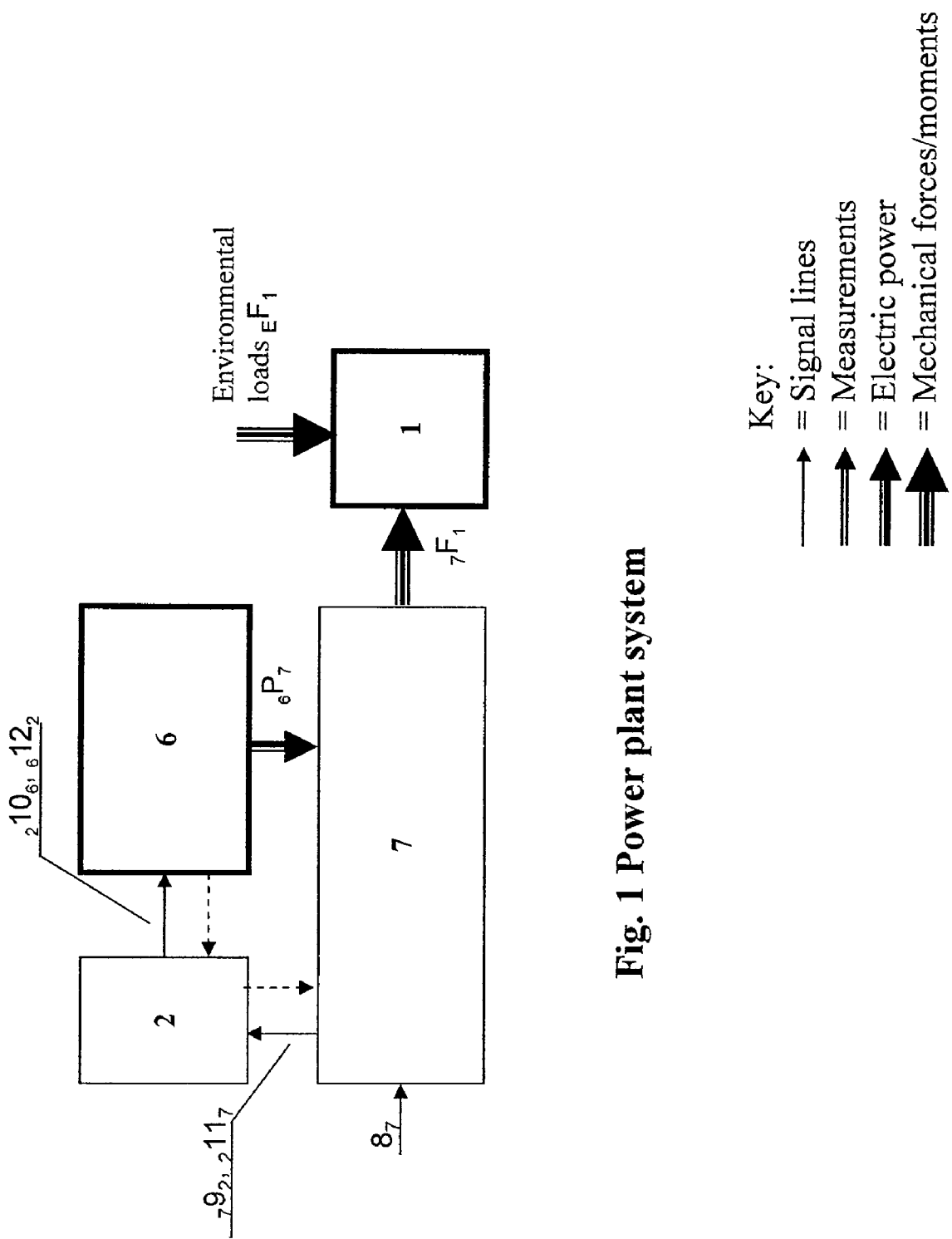
Fig. 1 Power plant system

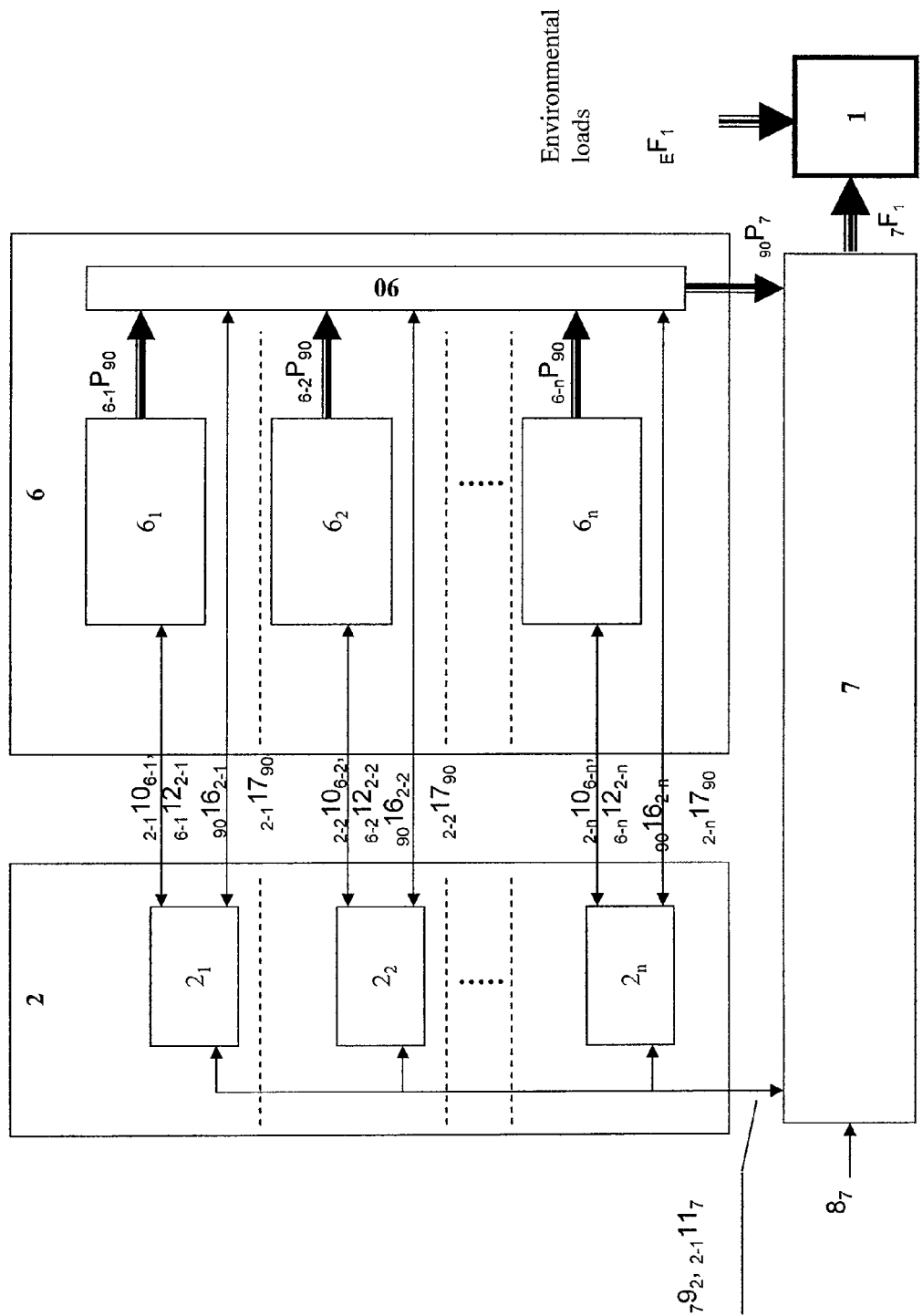
Fig. 2 Detailed power plant view with distributed PMS

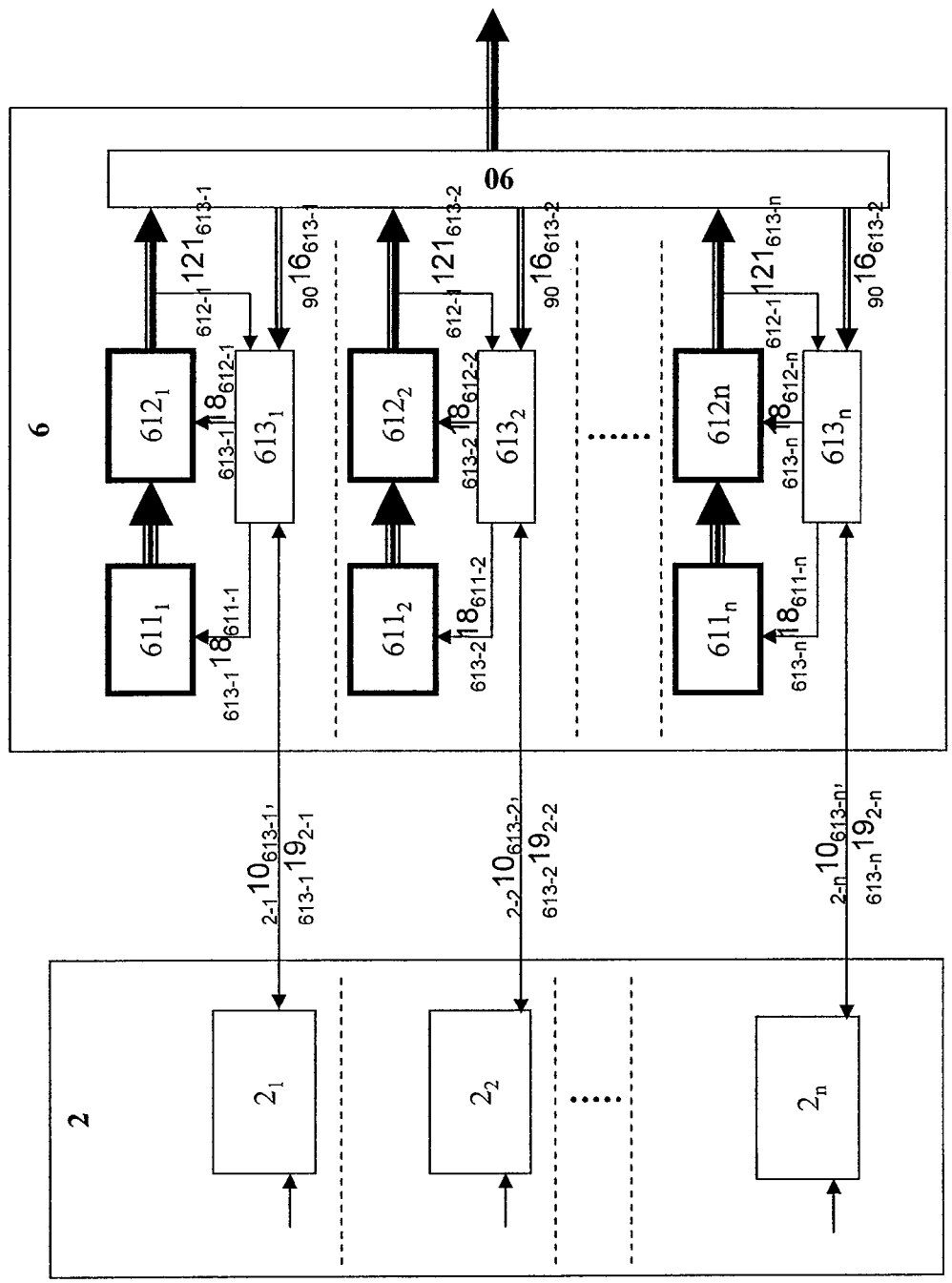
Fig. 3 Detailed view of generator power train setup

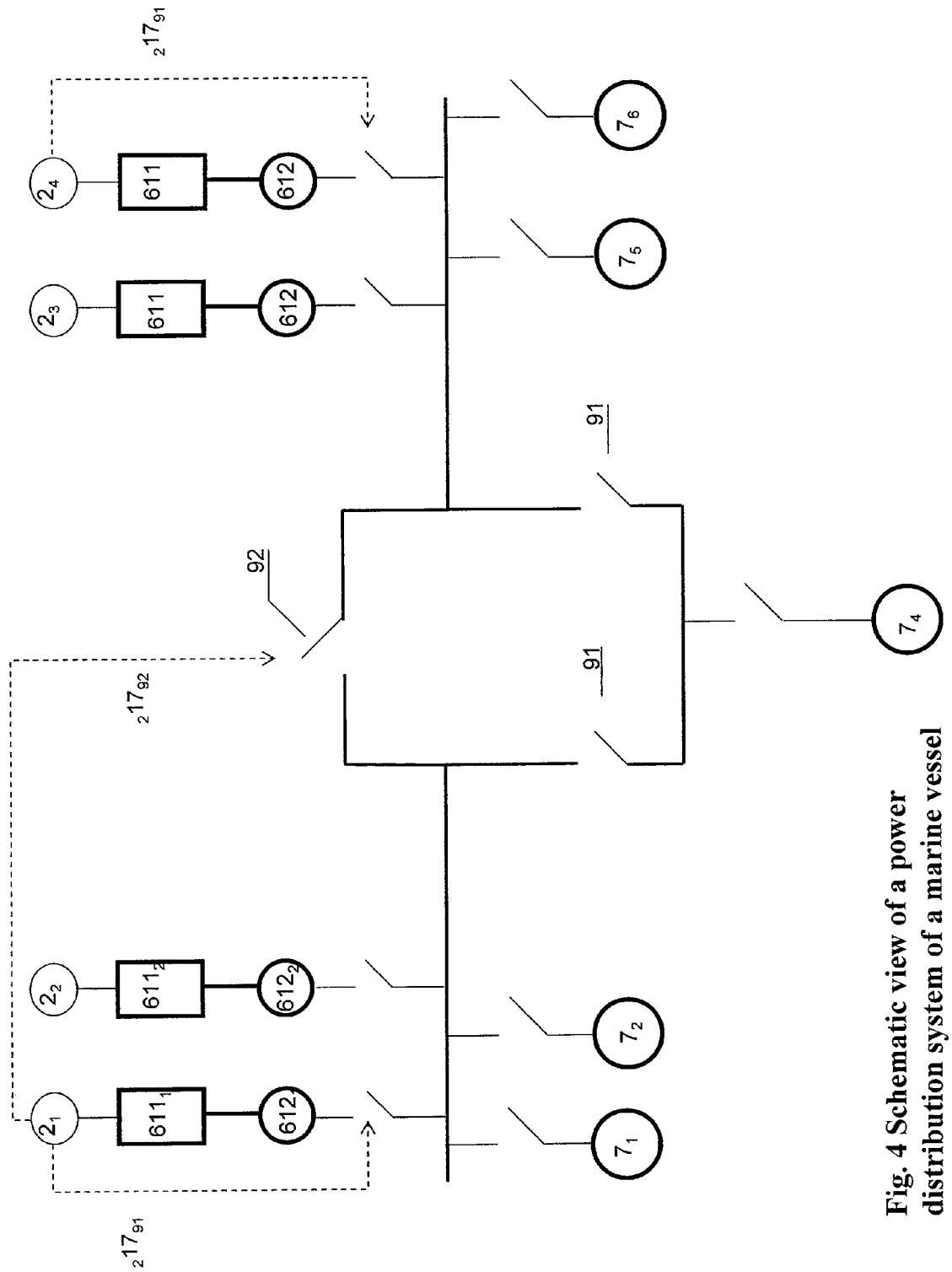
Fig. 4 Schematic view of a power distribution system of a marine vessel

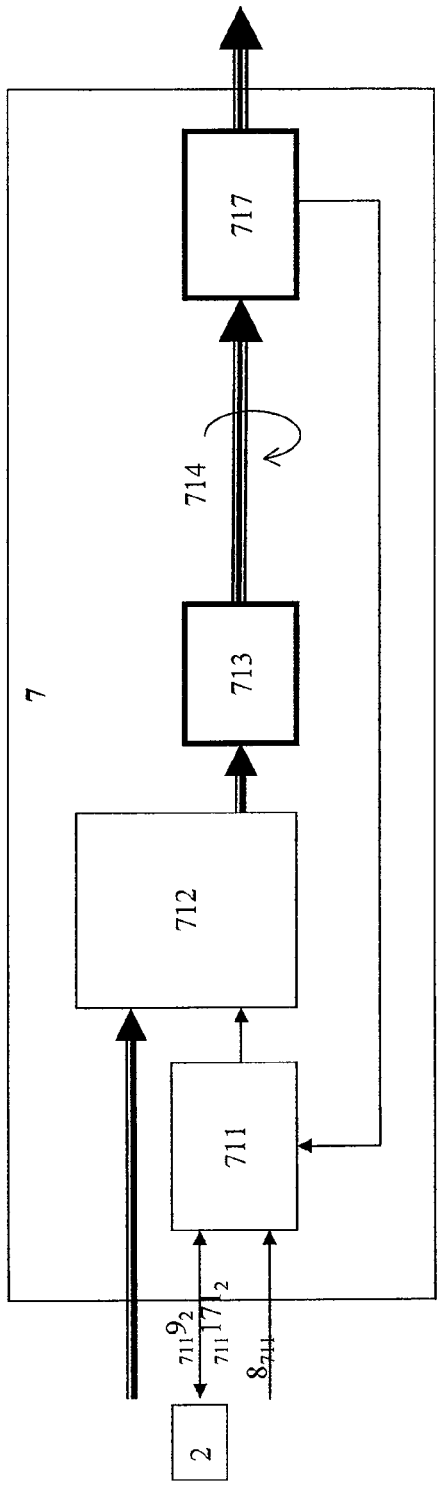
Fig 5a: Fixed pitch, variable speed thruster
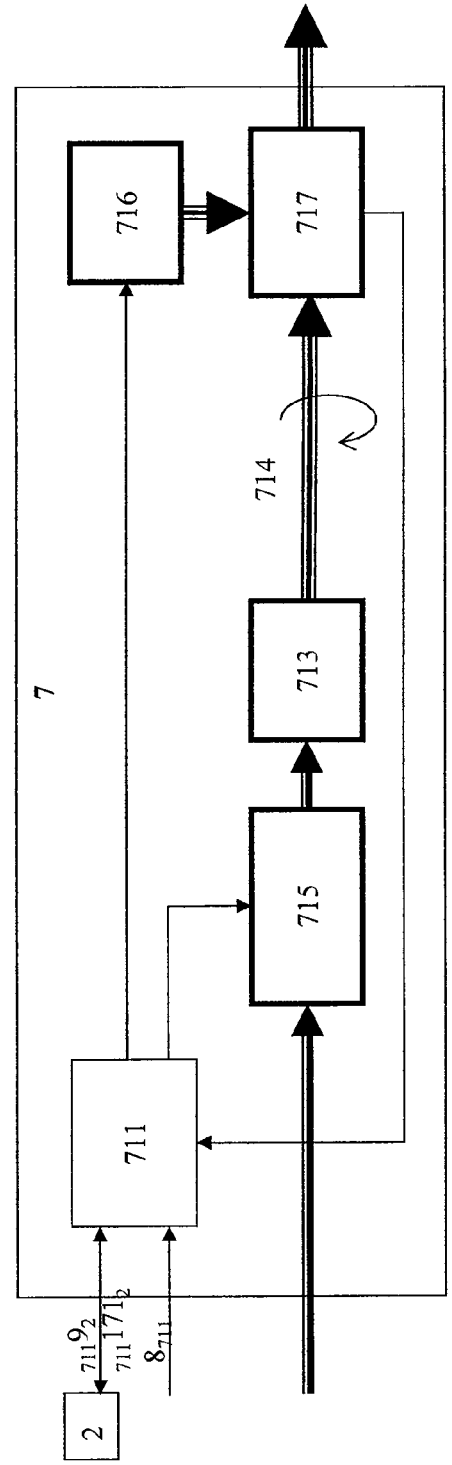
Fig 5b: Fixed speed, controllable pitch thruster.

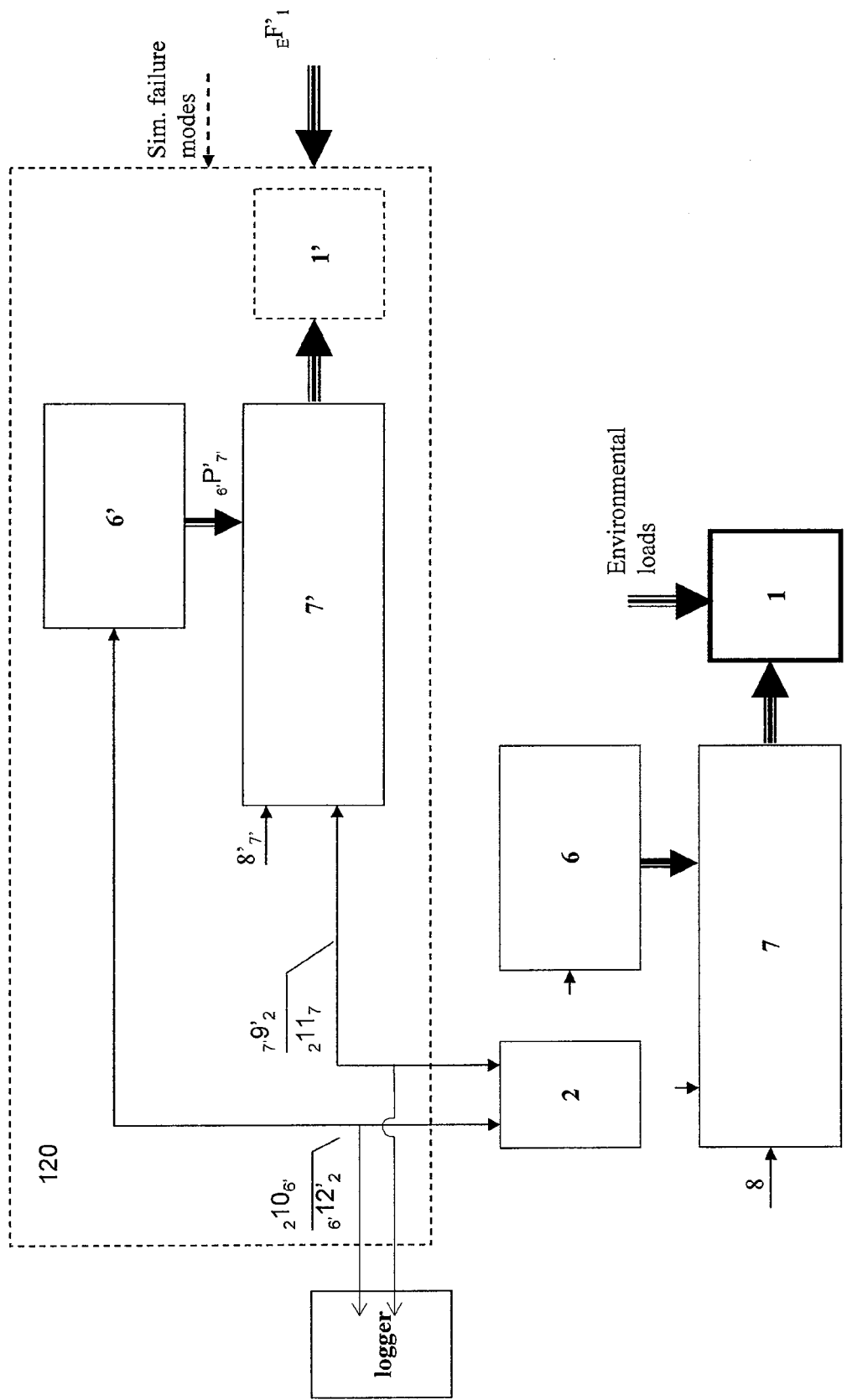
Fig. 6 Simulated power system

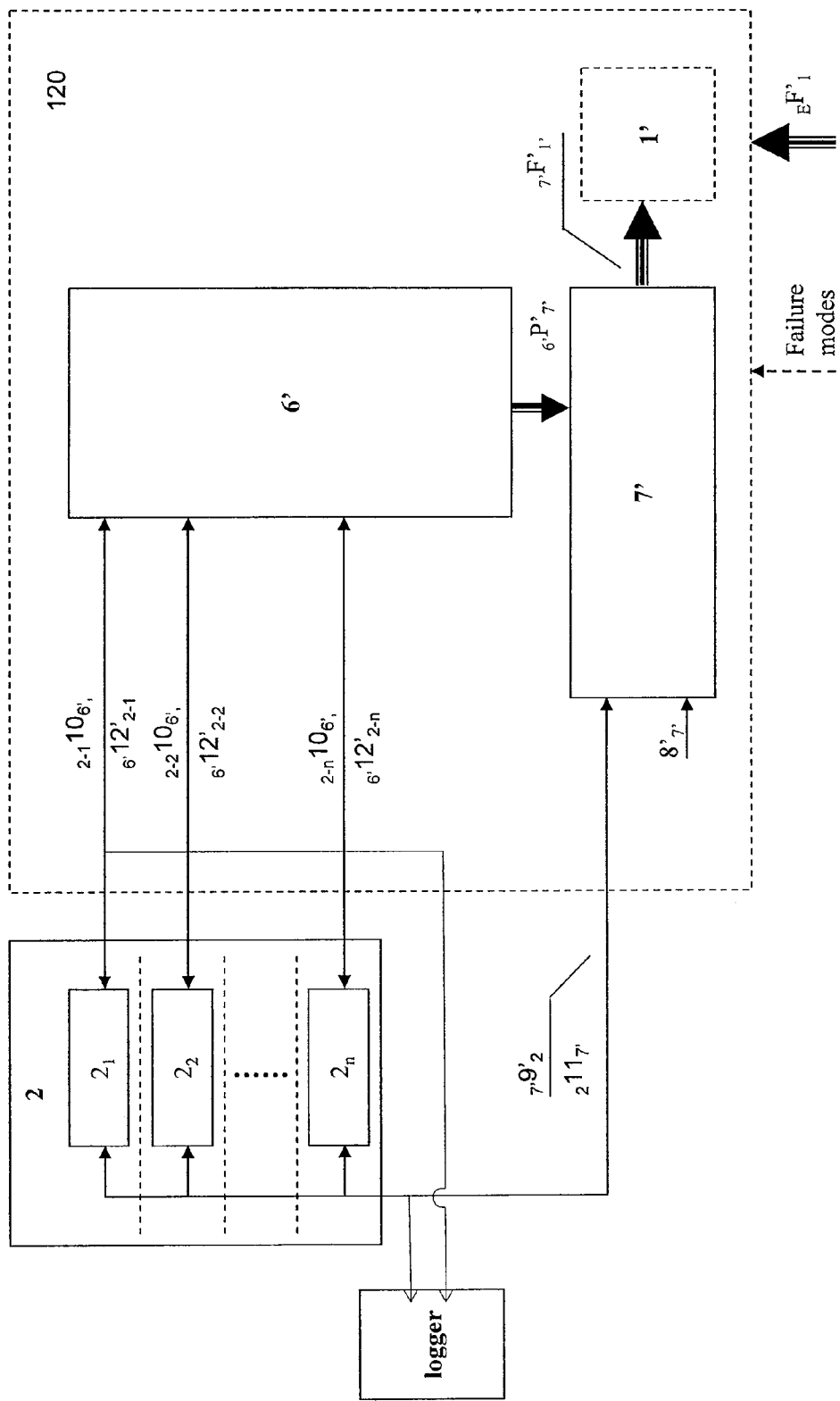
Fig. 7 Detailed view of testing of a fully integrated PMS

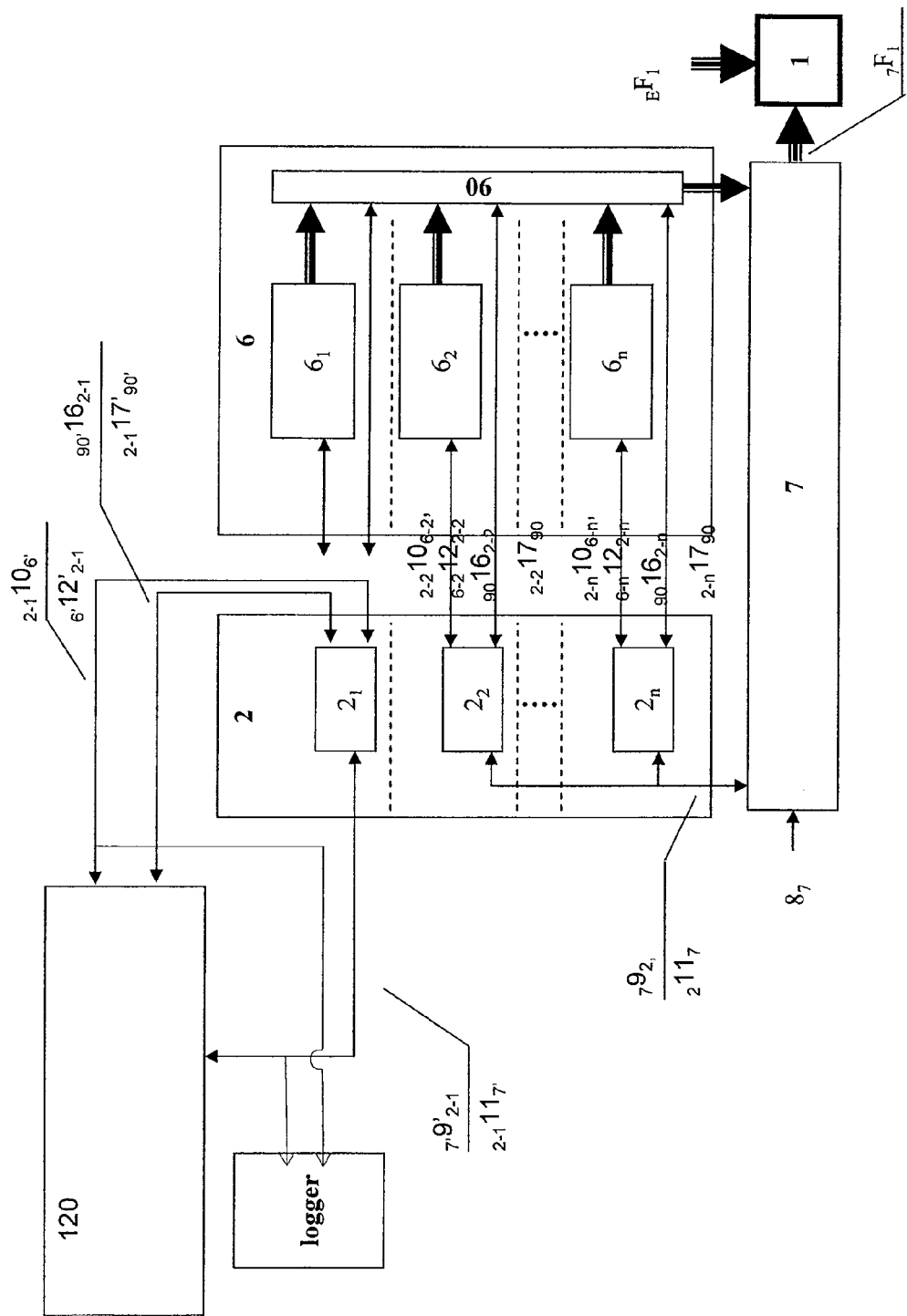
Fig. 8 Testing of a single PMS, in which said single PMS forms part of an integrated PMS

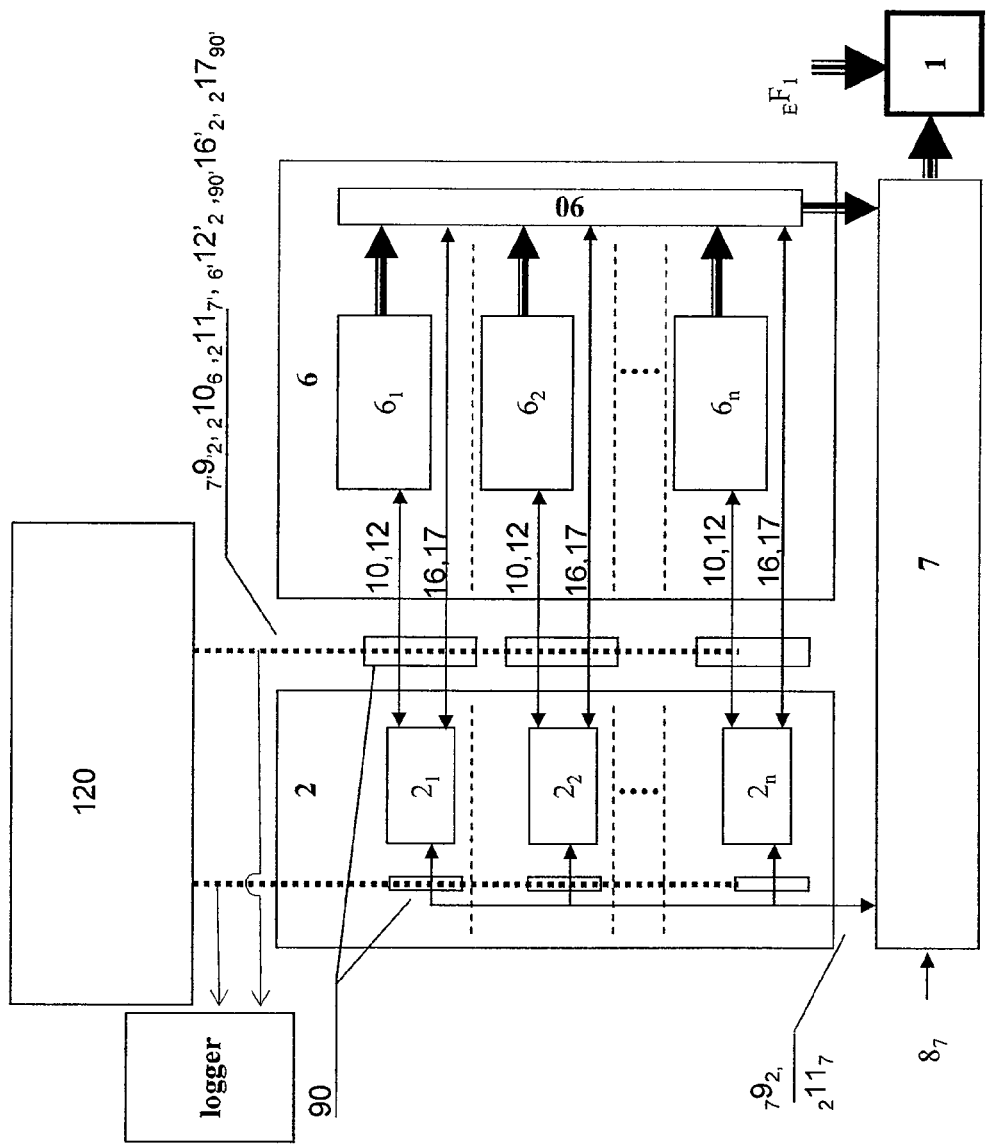
Fig. 9 Testing of multiple freely chosen distributed PMS

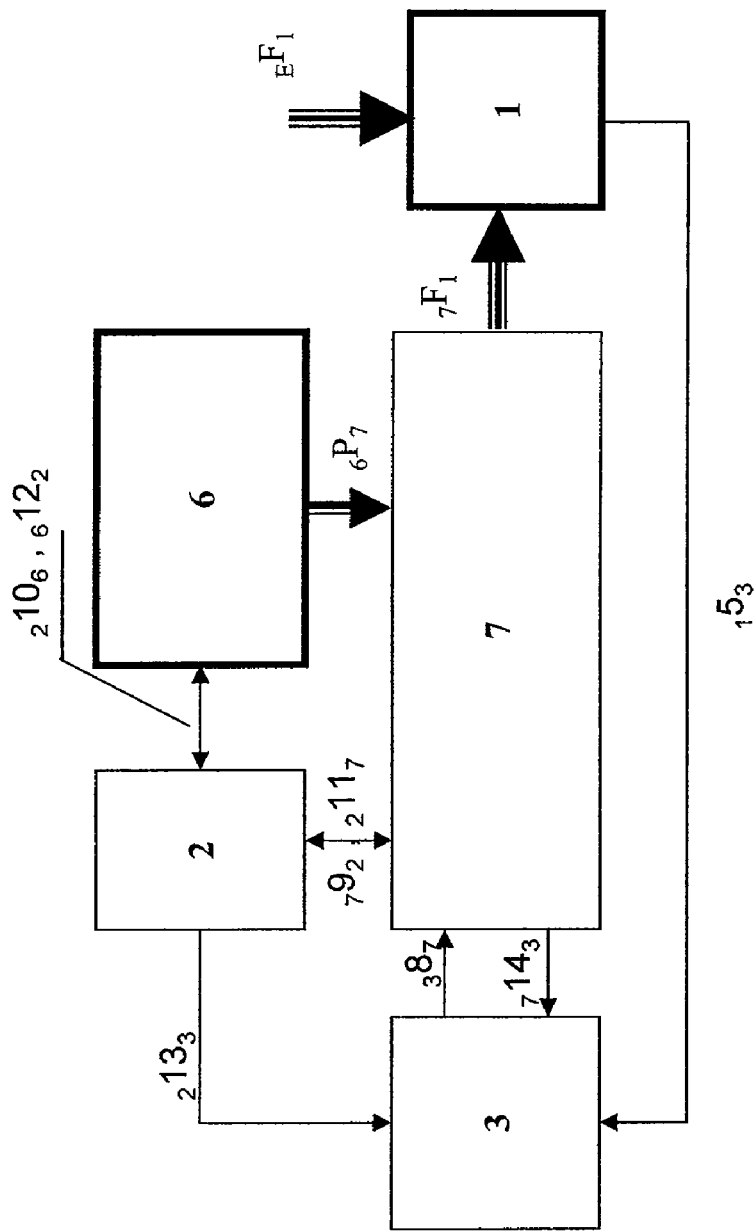
Fig. 10 Variations over PMS thruster system connections.
Fast load reduction signals arrive directly from the PMS to the thruster efficiently reducing the amount of power consumed by the thruster system.

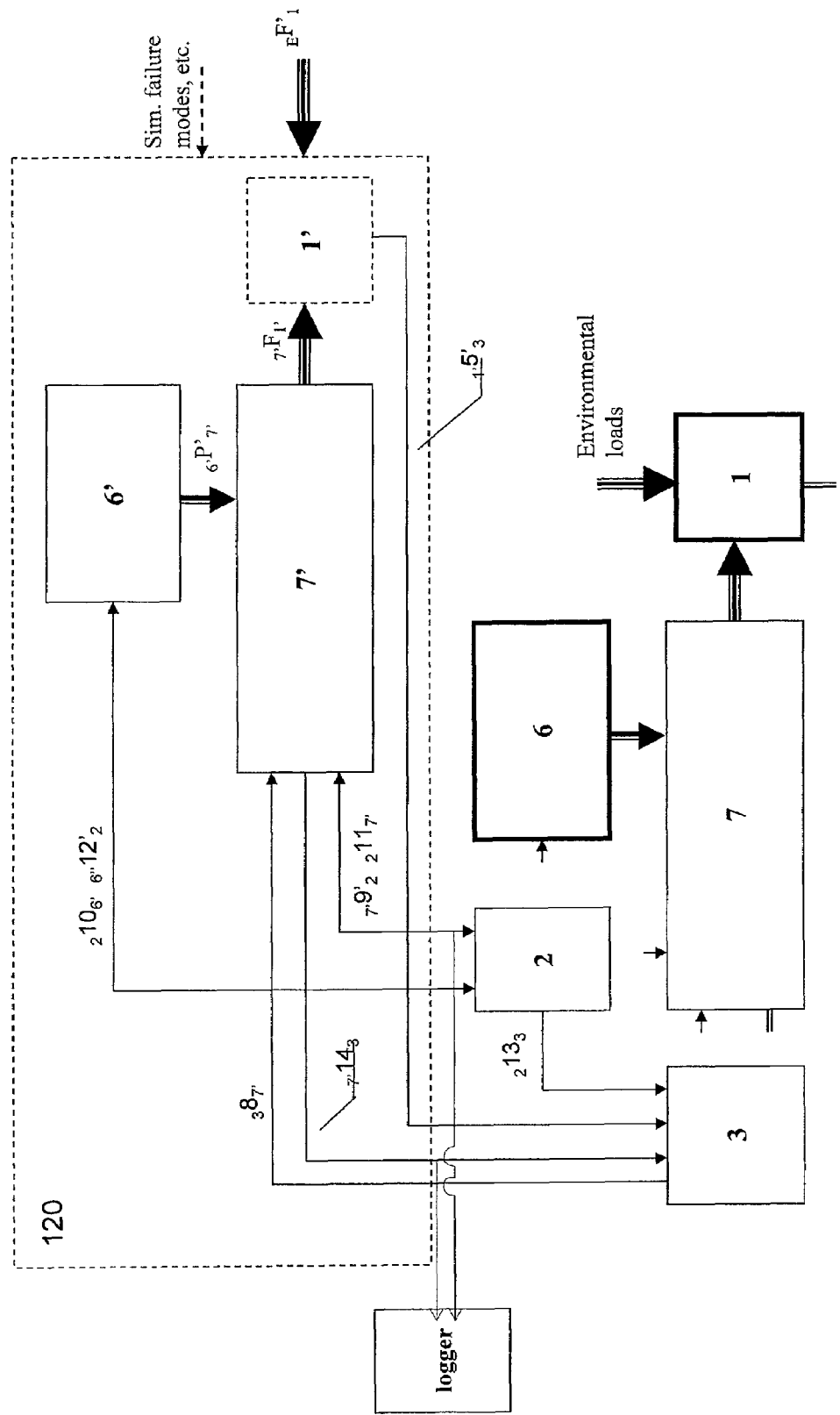
Fig. 11 testing of a combined DP/PMS system (real thrusters disconnected).

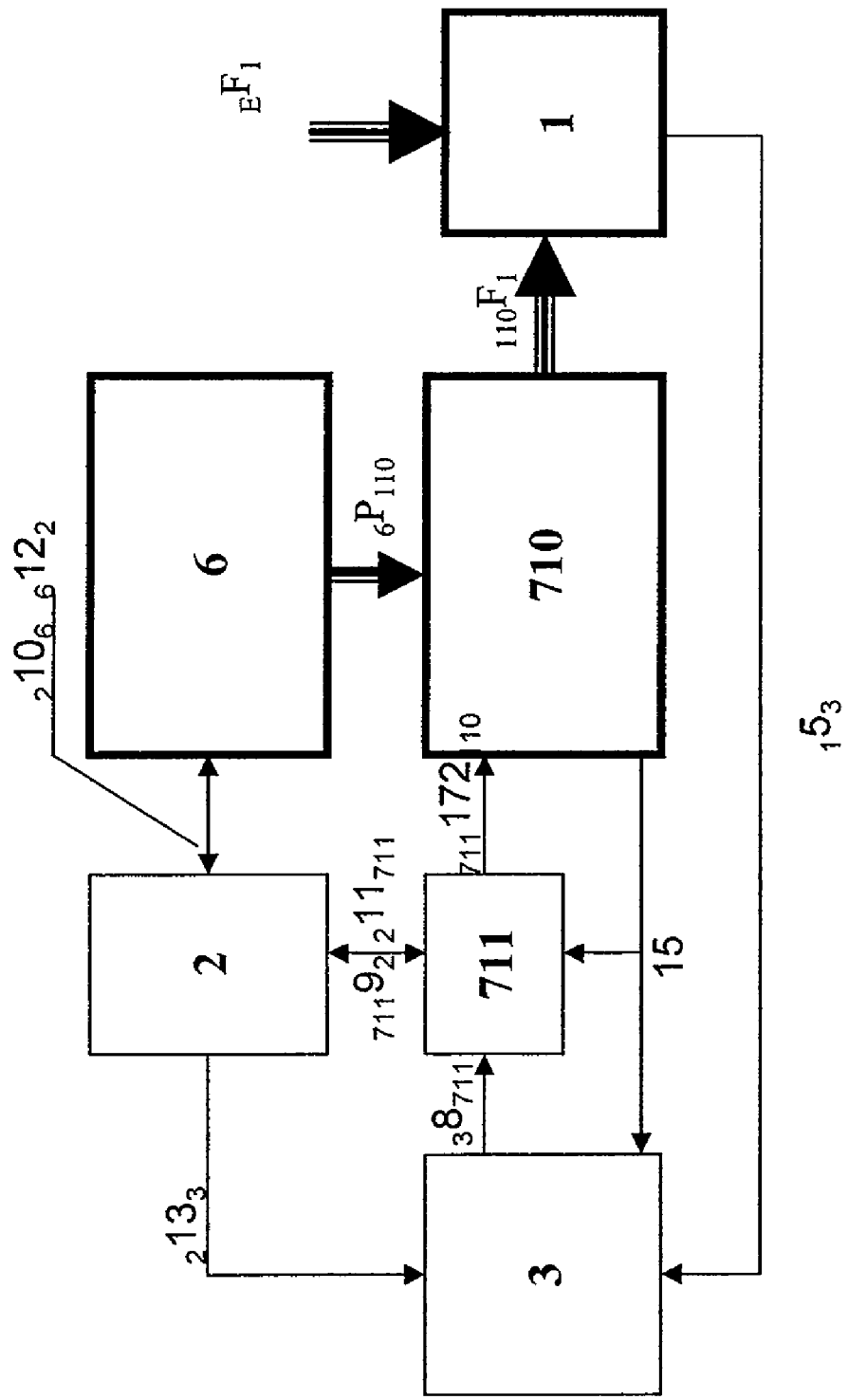
Fig. 12 Direct coupling TC (thruster control system) to PMS system

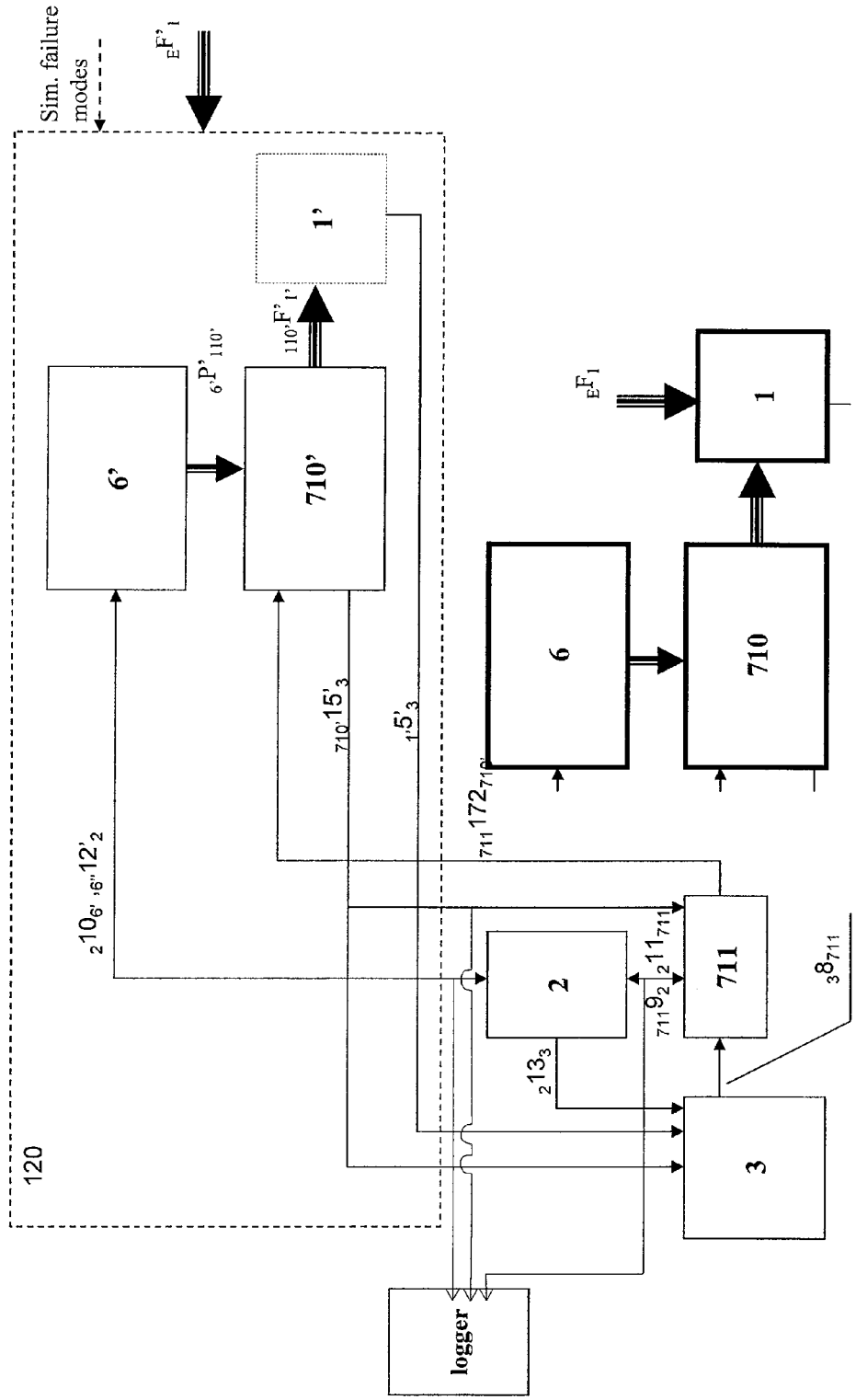
Fig. 13 Testing of TC, PMS, DP as HIL in which all propulsion/generation systems are simulated

METHOD AND A SYSTEM FOR TESTING OF A POWER MANAGEMENT SYSTEM OF A MARINE VESSEL

CROSS-REFERENCE TO RELATED PATENT APPLICATION

This application claims the benefit of Norwegian Patent Application No. NO20055813, filed Dec. 7, 2005, in the Norwegian Intellectual Property Office, the disclosure of which is incorporated herein in its entirety by reference.

Introduction

A vessel with a dynamic positioning (DP) system for station keeping or other applications, usually including an autopilot for conducting ordinary transit, will in many cases have diesel-electrical powering of propellers and thrusters. Electric energy is produced on board the vessel by a power plant that comprises electrical generators driven by diesel engines and/or gas turbines, and a marine automation system that includes a power management system (PMS). The electrical power consumed by the electrical engines for the propellers and thrusters may constitute a significant major part of the produced electrical power consumed on board. Consequently, if the control signals from a dynamic positioning "DP" control system to the PMS of the the electrical motors for propellers or thrusters incurs a high and rapidly changing power consumption, the result may be electrical power overload, large power fluctuations, or off-design operation of the power generation plant. This may incur a shut-down of the power plant and a highly undesired discontinuation in the supply of electrical power. This situation, which is referred to as a black-out, is costly and potentially dangerous, and may lead to loss of mission, damage of equipment, serious accidents and wrecking of the vessel. On this background it appears important to test the interaction between the DP control system and the power plant including the power management system and parts of the marine automation system, to make sure that black-outs, unacceptable power fluctuations, or other incorrect events or conditions will not occur under operation of the vessel. Presently used testing procedures do not allow for systematic testing of the PMS under demanding simulated, still realistic conditions. This motivates a need for testing methods and systems that can test and verify whether the PMS system will operate correctly under demanding but realistic operating conditions, or not.

There is a further need for systems and methods allowing for better simulations of the power system, as previously disclosed simulations of the power systems have been simplistic. A power management system on board a marine vessel may comprise many levels of power management, ranging from local power management systems arranged for controlling a thruster or a generator train, to higher level power management systems controlling the overall power system. The overall power system may function as an integrated power system in which several lower level power management systems form a single higher level PMS. The interaction between higher and lower control systems in such a power system hierarchy may comprise the sending of fast shutdown signals, as well as large and rapid fluctuations in the power supply. Additionally the power management system is commonly distributed over several units in separate bulkhead compartments along the entire vessel, and also ditributed between a port and starboard system, and may thus be difficult to test. Thus there is a need for testing of the various interactions between the higher level and lower level PMS, in order to ensure that the overall PMS is able to function correctly when subject to demanding but realistic conditions.

Hardware-in-the-loop Simulation

The power management system PMS (2) is tested in simulation, in which said PMS (2) is connected to a simulator (120). The PMS (2) may be disconnected from the vessel and tested as a hardware-in-the-loop, or still continue connected to the vessel (1). The simulator (120) inputs the commands which would otherwise be furnished to the PMS (2) and calculates the vessel motion that would have resulted with such thruster and rudder commands. The simulator returns the signals that would have resulted from the measurement system for the motion calculated by the simulator. Seen from the PMS (2) it appears that it is connected to the equipment installed on the vessel (1), while actually being connected to the simulator (120). The PMS (2) may be tested for a wide range of operational settings and environmental conditions, failure situations, and operator commands in this test configuration. This is a very powerful testing method that is of great importance. Previous simulation systems have not been able able to simulate in an adequate fashion the power generation systems (6) nor the power distribution grid (90) of a marine vessel (1), thus realistic testing of a PMS (2) has not been feasible. It is an object of the invention presented herein to facilitate such testing.

SHORT SUMMARY OF THE INVENTION

The present invention resolves some of the problems described above. The present invention discloses a system for testing a power management system of a marine vessel, in which said power management system is arranged for controlling systems that produce electrical energy, in which said power management system is arranged for receiving first signals from a power consuming system, in which said power management system, as a response to said first signals, is arranged for furnishing second control signals to a power generation system arranged for furnishing power P to said power consuming system. The novel and characterising parts of the system are as follows:

a simulator arranged for being connected to said power management system, said simulator including the following features:
   a simulated power consuming system arranged for receiving real and/or simulated control signals pertaining to a desired state of said simulated power consuming system,
   a simulated power generation module arranged for furnishing simulated power P' to said simulated power consuming system,
   said simulated power consuming system arranged for furnishing simulated signals (9') to said real power management system,
   said real power management system arranged for furnishing control signals to said simulated power generation system as a response to said simulated signals,
   said simulated power generation system arranged for providing simulated power to said simulated power consuming system as a response to said control signals,
so as for the functional testing and/or failure mode testing of said power management system under said simulated signals.

The present invention further discloses a method for testing the power management system of a marine vessel, in which said power management system controls electrical energy generation systems, in which said power management system receives first signals from a power consuming system, and as a response to which said power management system furnishes second control signals to a power generation system furnishing power to said power consuming system. The novel and characterising actions of the method comprise:

connecting a simulator to said power management system, said simulator providing simulated control signals pertaining to a desired state of a simulated power consuming system, to said simulated power consuming system, or an external control system providing real control signals pertaining to said desired state of said simulated power consuming system, said simulator comprising a simulated power generation module furnishing simulated power P' to said simulated power consuming system, said simulated power consuming system providing simulated signals to said real power management system, said real power management system furnishing control signals to said simulated power generation system as a response to said simulated signals, said simulated power generation system providing simulated power P' to said simulated power consuming system as a response to said control signals, so as for the functional testing and/or failure mode testing of said power management system under said simulated signals.

Additional advantageous features of the present invention are disclosed in the detailed description of the invention.

SHORT FIGURE CAPTIONS

The attached figures are meant to illustrate the invention only, and shall not be construed to limit the invention, which shall be limited by the attached patent claims only. Some of the reference numerals are provided with first and second lower case indicatives, namely the signal numerals. The numerals of the signals are given such as the preceding lower case indicative gives the source of the signal, the main or middle numeral gives the signal name, and the trailing lower case numeral indicates the signal target.

FIG. 1 schematically describes a system in which a power consuming system (7) receives control signals ($8_7$) from a control system that is not shown here, and in which said power consuming system (7) furnishes control signals ($_7 9_2$) to a power management system (PMS) (2). As a response to said thruster control signals ($_7 9_2$) the PMS (2) sends PMS control signals ($_2 10_6$) to a power generation system (6) which, in response, furnishes electrical power ($_6 P_7$) to the power consuming system (7). The power consuming system (7) furnishes power to a vessel (1), in which said vessel may be further exposed to enviromental forces and moments ($_E F_1$). The power consuming system (7) may also be a non-propulsion power consuming system, such as cranes, heating or refrigerating systems, pumps, heave compensation systems, compressor trains, etc.

FIG. 2 describes a distributed PMS (2), in which the PMS (2) comprises a plurality of power management subsystems ($2_1, 2_2, \ldots$), in which each power management subsystem ($2_1, 2_2, \ldots$) controls one or more power generation systems ($6_1, 6_2, \ldots, 6_n$). The power management subsystems ($2_1, 2_2, \ldots$) may function independently as separate power management systems, or be interconnected to form a centralised PMS (2). The power consuming system (7) furnishes control signals ($_7 9_2$), such as a signal for requiring a specific change of power consumption as a response to the control signal (8). The control signals ($_7 9_2$) are sent to the PMS (2), and the PMS (2) must make decisions pertaining to which actions should be taken as a response to said control signals ($_7 9_2$), such as the start up or shut down of a further generator, the opening and closing of power switches, increasing the power production from a running generator, etc. The power management system (2) may also receive power grid feedback signals ($_{90} 17_2$) pertaining to the state of the power grid (90) (voltage, current, frequency).

FIG. 3 describes schematically in more detail a power generation system (6), in which a PMS (2) may control several separate power generation systems (6). The PMS (2) may comprise several power management subsystems ($2_1, 2_2, \ldots$), and each power management subsystem ($2_1, 2_2, \ldots$) furnishes PMS control signals ($_2 10_{613}$) to a local power controller (LPC) (613) which in turn controls the subelements such as the prime mover (611) and the electrical generator (612) of the power generation system (6).

FIG. 4. shows a simplified schematic view of a distributed power generation system (6) on a marine vessel, in which is shown several separate power generation systems ($6_1, 6_2, \ldots$) furnishing power to a central power grid (90), and thrusters (7) which may receive power from said central power grid (90). Also shown are separate PMS subsystems ($2_1, 2_2, \ldots$) for each respective power generation system ($6_1, 6_2, \ldots$) as well as switches or tie breakers (91) arranged for being opened or closed according to need.

FIG. 5a schematically shows a typical thruster system (7), in which a local thruster controller (LTC) (711) receives thruster control signals ($8_{711}$) and furnishes control signals (9) to a PMS (2) and a power electronics section (712) of the thruster system (7). The PMS (2) controls a power generation system (6) (not illustrated here) which in turn furnishes electrical energy to the power electronics section (712) of the thruster (7). Within the power electronics section, also known as a variable speed drive (VSD) (712) of the thruster (7) there may exist very large power fluctuations which are difficult to simulate or model. The power electronics (712) controls and furnishes energy to the motor which in turn drives a shaft which in turn drives a propeller (717). In this configuration, only the speed of the shaft (714) and thus the propeller (717) need be controlled.

FIG. 5b schematically shows an alternative configuration of a thruster system (7) in which an LTC (711) furnishes control signals to a pitch server (716) setting the pitch of the propeller (717). The LTC (711) further furnishes control signals ($_2 9_{711}$) to a PMS (2) which controls a power generation system (6) (not shown here). The power generation system (6) furnishes power to a shaft train (714) which drives a propeller (717). The pitch server (716) controlled by the LTC (711) sets the pitch of the propeller (717). Actuator feedback signals are fed back to the LTC (711) which compares the actuator feedback signals to the set point values, and performs appropriate actions. In this configuration of the thruster system (7), only the pitch of the propeller (717) need be controlled, whereas the speed of the shaft (714) may be constant.

FIG. 6 shows a test diagram of a PMS (2) in which the PMS (2) of the marine vessel (1) is (optionally) disconnected from the real power consuming system (7) and the real diesel electric power generation system (6), and connected to a simulated power consuming system (7') and a simulated power generation system (6') that are comprised in a simulator (120), with signals (9, 10) to and from the PMS (2) being logged on a logger during a test.

FIG. 7 describes a similar situation as in FIG. 6 but in which the PMS (2) is a distributed PMS (2), in which the PMS (2) comprises a plurality of power management subsystems ($2_1, 2_2, \ldots$).

FIG. 8 describes a distributed PMS (2) comprising a plurality of power management subsystems ($2_1, 2_2, \ldots$), in which one single of said power management subsystems ($2_1, 2_2, \ldots$) is tested.

Additionally, a central PMS (2) may control the overall power generation needs of the entire vessel, or one or more of the power management subsystems ($2_1, 2_2, \ldots$) may function as said central PMS (2).

FIG. 9 illustrates a test scheme in which one or more power management subsystems ($2_1, 2_2, \ldots$) of a distributed PMS (2) is tested by a simulator (120). The power generation modules ($6_i$) of the vessel may be distributed in separate compartments of the vessel, each with a local power management subsystem ($2_i$), of which said local power management subsystems may be interconnected by a data network. The simulator (120) comprises simulation modules such as a simulated power generation module (6') and a simulated vessel (1').

FIG. 10 illustrates a situation in which DP control system (3) furnishes control signals ($_3 8_7$) to a power consuming system (7).

FIG. 11 illustrates a test situation in which interactions between the real PMS (2) and the real DP control system (3) are tested against a simulator (120). The PMS (2) and the DP control system (3) are (optionally) disconnected from the power generation system (6) and the thruster system (7) of the marine vessel (1) and connected to said simulator (120), and may be run for testing either under simulated failure modes, functional testing or performance testing.

FIG. 12 illustrates a situation similar to the system as described above, but in which the thruster control system (711) is considered to be a separate unit in the thruster system (7), and may thus be included in the tested hardware with the control system (3) and the PMS (2), please see FIG. 13 below. In this scenario, the DP control system (3) furnishes thruster control signals ($_3 8_{711}$) to the thruster control system (711) which, as a response to said thruster control signals ($_3 8_{711}$), furnishes power control signals ($_{711} 9_2$) to said PMS (2).

FIG. 13 illustrates a test set up in which interactions between the real thruster control system (711) as well as the PMS (2) and the DP control system (3) are tested. The systems are disconnected from the real system of the vessel (1), and connected to a simulator (120). The simulator (120) is similar to the simulators as described above, but further comprises a simulated propulsion unit (710') controlled by the LTC (711), instead of the simulated entire complete power consuming unit (7').

DETAILED DISCLOSURE OF PREFERRED
EMBODIMENTS OF THE INVENTION

The invention herein presented is a test system and method for testing a power management system (2) on a marine vessel (1). Said power management system (2) is arranged for controlling one or more systems (6) that produce electrical energy to be consumed by a power consuming system (7), please see FIG. 1. In a first preferred embodiment of the invention, said power consuming system (7), e.g. a thruster system, is arranged for receiving control signals ($8_7$) pertaining to a desired state of said vessel (1), such as desired speed, shaft speed, heading, etc. As a response to said command signals ($8_7$) said power consuming system (7) is arranged for furnishing signals ($_7 9_2$) such as signals indicating need for specific shaft speed, to said power management system (2) which in turn as a response to said signals ($_7 9_2$) will furnish second control signals ($_9 10_6$) to a power generation system (6). Said power generation system (6) will as a response to said second signals ($_7 9_2$) furnish power to the power consuming system (7) which will furnish power to the marine vessel (1). Said signals (9) from the power consuming system (7) to the PMS (2) may also, amongst others, be sensor signals, control signals, status signals or feedback signals.

In a preferred embodiment of the invention said signals (9) from the power consuming system (7) to the PMS (2) are signals or control signals indicating specific power requirements.

The PMS (2) may also send control signals ($_2 11_7$) directly to the thruster system (7) if so required. These signals may comprise fast load reduction signals if the PMS (2) detects a situation in which a sharp decrease in the power consumption of the power consuming system (7) is deemed necessary. Additonally, the PMS (2) receives power generation feedback signals ($_6 12_2$) from the power generation system (6) pertaining to the state of the power generation system (6). The power consuming system (7) will furnish forces ($_7 F_1$) which act on the vessel (1) changing or maintaining a state of said vessel (1). When testing said power management system (2), said power management system (2) may, or may not, be disconnected from the corresponding real power consuming system (7) and said real power generation system (6), and be connected to a simulator (120) which comprises corresponding simulated power consuming systems (7'), simulated power generation system (6') and possibly a simulated vessel (1'). The simulated power consuming system (7') will receive real or simulated command signals ($8'_7$) pertaining to a desired state of said simulated power consuming system (7'), and will, as a response, furnish simulated control signals ($_7 9_2$) to said real PMS (2). The real power management system (2) will, as a response to said signals ($_7 9_2$), furnish control signals ($_9 10_{6'}$) to said simulated power generation system (6'), which will furnish a higher or lesser quantity of simulated power ($_6 P_{7'}$) to said simulated power consuming system (7'). The power consuming system (7') will thus, in accordance to the command signals ($8_7$) received, be able to furnish the required force to said vessel (1'). In this manner, functional, failure mode, and performance testing of said real PMS (2) may be conducted.

In a preferred embodiment of the invention, the simulated power consuming system (7') receives thruster commands ($_8 7$) which may be simulated or real (8,8'). As a response to these thruster command signals ($_8 7$), the power consuming system (7) furnishes simulated signals ($_7 9'_2$) to said PMS (2). As a response to these signals ($_7 9'_2$) the PMS (2) furnishes control signals ($_2 10_{6'}$) to said simulated power generation system (6'). As a response to said control signals ($_2 10_{6'}$) the simulated power generation system (6') furnishes simulated power ($_6 P'_7$) to the simulated power consuming system (7'), which in turns furnishes simulated forces ($_7 F'_1$) to a simulated vessel (1'). The simulated power generation system (6') furnishes simulated power generation feedback signals ($_6 12'_2$) to the PMS (2). The simulated vessel (1') may also be subject to simulated enviromental loads ($_E F'_1$) influencing the behaviour of the simulated vessel (1'). In a further preferred embodiment, the simulated vessel (1') may experience simulated failures and simulated failure modes, functional testing or performance testing for the testing of the PMS (2).

By functional testing is meant the testing of a system to ensure that said system is capable of performing all intended actions. For a PMS (2) such actions may amongst others be the appropriate opening and closing of power switches (91), the appropriate start up and shut down of generators (612), the appropriate response to control signals to said PMS (2), etc. By failure mode testing is meant the testing of a system to ensure that said system reacts in a desired manner to failure modes. A failure mode is defined as being functional manifestations of failures, in which said failures being the inability of components to perform their function due to faults, in which said faults being defects in said components. Said failure modes may comprise amongst others:
miscalibrated input signals,
out of range input signals,
disturbances on input signals,
interchanged input signals,
removed or missing input signals,
delayed input signals,
malfunctioning power consuming system (7),
malfunctioning power generation systems (6),
malfunctioning command devices (4), etc.

In a preferred embodiment of the invention, the command system (3) is a dynamic position (DP) system (3) which furnishes command signals ($_3\mathbf{8}_7$) to said power consuming systems (7) as shown in FIG. 1. In this embodiment of the invention, the power consuming systems (7) mainly comprise thruster systems (7), and the command signals ($_3\mathbf{8}_7$) furnished to the thurster system (7) mainly comprise commands as to the desired heading and speed or desired heading and position of the marine vessel (1). The DP system (3) may receive commands from a command input device (4) such as a command console with a steering wheel, a joystick, rollerball etc, which furnishes command signals (41) to said DP system (3). In an embodiment of the invention, said simulator (120) comprises a vessel module (1') comprising algorithms arranged for calculating the resulting dynamic vessel motion when said vessel (1') is furnished force by the thruster system (7'). The simulated vessel (1') may also be influenced by simulated enviromental forces ($_E\mathbf{F}_{1'}$) such as wind, currents and waves. The simulated vessel (1') is arranged for taking such forces into account when calculating the resulting simulated vessel motion. This allows for the testing of the PMS (2) when said simulated thruster system (7') receives commands pertaining to the desired motion of the vessel (1'). The PMS (2) may be tested for the appropriate handling of situations in which the thruster systems (7') are subject to rapidly varying power demands . . . . Thus situations which rarely arise, but which nevertheless are important to test for, may be examined.

FIG. 5a illustrates a first thruster configuration, a so called fixed pitch, variable speed thruster, in which the propeller pitch is fixed, whereas the shaft speed may be varied. A local thruster controller (711) receives command signals ($\mathbf{8}_{711}$) which may originate from a DP system (3), and as a response furnishes signals ($_{711}\mathbf{9}_2$) to one or more power management subsystems. As a response to said signals ($_{711}\mathbf{9}_2$), the power management system (2) and/or one or more power management subsystems ($\mathbf{2}_1$, $\mathbf{2}_2$) and a power generation system (6) furnishes power to a power electronics unit (712). Said power electronics unit (712) is arranged for receiving commands from said local thruster controller (711) with respect to the desired thruster state. The power electronics unit is arranged for modifying the power received in order to achieve the desired power state. The power electronics unit (712) furnishes power to a motor (713) which drives a shaft (714), which in turn drives a propeller (717) or other propulsion means. Said local thruster controller (711) receives feedback signals from the propulsion system (712,713,714,717) pertaining to the state of said system, and may perform additional corrections as a response to said feedback signals.

FIG. 5b illustrates a second thruster configuration, a so called fixed speed, controllable pitch thruster, in which the propeller pitch is controlled whereas the shaft speed is fixed. As above, a local thruster controller (711) receives command signals ($\mathbf{8}_{711}$) which may originate from a DP system (3), and as a response furnishes signals ($_{711}\mathbf{9}_2$) to one or more power management subsystems. As a response to said signals ($_{711}\mathbf{9}_2$), the power management system (2) and/or one or more power management subsystems ($\mathbf{2}_1$, $\mathbf{2}_2$) and a power generation system (6) furnishes power to a motor starter (715) which starts the motor (713) for running the shaft (714) and propeller (717). The local thruster controller will in this embodiment furnish control signals to a pitch servo (716) arranged for setting the pitch of said propeller (717), and thus altering the force furnished from the thruster system (7) to said vessel (1). The local thruster controller (711) receives feedback signals from the propulsion system (712,713,714,717) pertaining to the state of said system, and may perform additional corrections as a response to said feedback signals.

In a further preferred embodiment of the invention, the simulated power consuming systems (7') corresponding to their real counterparts may comprise, but are not limited to, one or more of the following:
a simulated petroleum process train (7'b) or similar,
a simulated gas compressor line (7'c) for petroleum processing or gas reliquefying,
a simulated heave compensation system (7'd) for drilling or petroleum production,
a simulated refrigeration or heating system (7'e) for passenger or cargo ships,
a simulated pump system (7'f), e.g. for ballasting or loading/unloading,
a simulated crane system (7'g).

Thus the herein presented invention allows the testing of power consumption needs on drilling platforms which have large energy needs when performing drilling, pumping and station keeping operations, or power consumption for heating and cooling in large passenger ships, etc.

The power management system (2) may comprise a plurality of power management subsystems ($\mathbf{2}_1, \mathbf{2}_2, \ldots$) wherein each power management subsystem ($\mathbf{2}_1, \mathbf{2}_2, \ldots$) may at need function independently, or be interconnected to form a central PMS (2). This configuration may be considered to form a distributed PMS (2). A distributed power management system may be required to have separate spare systems for port and starboard side of the ship, separate systems in separate bulkhead compartments of the ship. In another embodiment of the invention, the power management subsystems ($\mathbf{2}_1, \mathbf{2}_2, \ldots$) may in turn be controlled by a higher level PMS (2) which monitors and controls the overall performance of the power system. The interactions between the power management subsystems ($\mathbf{2}_1, \mathbf{2}_2, \ldots$) may be complex, and it is an object of the present invention to be capable to examine the properties of a such distributed PMS (2). The interconnection between said power management subsystems ($\mathbf{2}_1, \mathbf{2}_2, \ldots$) is of use to provide robustness to the system if the power system is subject to disruptions. Such disruptions may be the failure of one of said power management subsystems ($\mathbf{2}_1, \mathbf{2}_2, \ldots$) in which case it is necessary for a second of said power management subsystems ($\mathbf{2}_1, \mathbf{2}_2, \ldots$) to be capable to take over the functions of said malfunctioning subsystem so as for at least the minimum power generation needs of the marine vessel (1) to be met. Furthermore, the power management subsystems ($\mathbf{2}_1, \mathbf{2}_2, \ldots$) may be arranged so as for each subsystem ($\mathbf{2}_1, \mathbf{2}_2, \ldots$) to be dedicated to serving a unique power consuming unit (7). As a consequence the power management subsystems ($\mathbf{2}_1, \mathbf{2}_2, \ldots$) may be also arranged at separate locations on board the vessel (1). In a preferred embodiment of the invention, the test system method allows for the testing of one or more of said distributed power management subsystems ($\mathbf{2}_1, \mathbf{2}_2, \ldots$), by connecting the one or more power management subsystems ($\mathbf{2}_1, \mathbf{2}_2, \ldots$) to said simulator (120), and furnishing real and/or simulated signals ($_7\mathbf{9}_{2\text{-}1}$, $_7\mathbf{9'}_{2\text{-}1}$,) and logging the corresponding responses of said power management subsystems ($2_1, 2_2, \ldots$).

Arranging the power management subsystems ($2_1, 2_2, \ldots$) at separate locations on the marine vessel (1) is common, as the power generation system may further comprise a plurality of power generation subsystems ($6_1, 6_2, \ldots$), where each power generation subsystems ($6_1, 6_2, \ldots$) is a separate and independant power generation system ($6_1, 6_2, \ldots$). In a preferred embodiment of the invention, the simulator of the invention comprises simulated power generation subsystems ($6_1', 6_2', \ldots$) each furnishing simulate power to a real or simulated simulated power distribution grid (90, 90') as shown in FIG. 2 and FIG. 8. In a further preferred embodiment of the invention, each power management subsystem ($2_1, 2_2, \ldots$) may perform operations such as amongst others controlling one or more power generation subsystems ($6_1, 6_2, \ldots$), or controlling the opening and closing of power switches and/or bus breakers (91, 92) on the power grid (90).

Referring to FIG. 2, the power generation subsystems furnishes power ($_6P_{90}$) to an electrical grid (90). The power is then furnished from said grid (90) to said power consuming system (7). Each power management subsystem ($2_1, 2_2, \ldots$) may furnish PMS control signals ($_2 10_6$) to one or more of said power generation subsystems ($6_1, 6_2, \ldots$) and receives power generation feedback signals ($_6 12_2$) from the power generation system (6). The PMS (2) may as a response to said power grid feedback signals ($_{90} 17_2$) act independently of the thruster system (7), and furnish control signals ($_2 16_{90}$) to the power grid (90) such as control signals for the opening or closing of switches (91). The PMS (2) or one or more of said power management subsystems ($2_1, 2_2, \ldots$) may also command the start up or shut down of power generation subsystems ($6_1, 6_2, \ldots$). Each separate power management subsystem ($2_i$) may further be arranged for controlling a corresponding real or simulated power generation subsystem ($6_i, 6_i'$).

The power generation system (6) may comprise several power generation sub elements such as a prime mover (611) e.g. a diesel engine or a gas turbine, a generator (612) and a local power controller ( LPC) (613). Said LPC (613) may comprise one or more of a "Governor" (614) which regulates the speed of the generator (612) i.e. the frequency of the produced electrical power, and an automatic voltage regulator (AVR) (615), which controls the voltage of the produced electrical power. The LPC (613) receives generator feedback signals ($_{612} 121_{613}$) from the generator (612), as well as power network feedback signals ($_{90} 16_{613}$) from the real or simulated power grid (90, 90'). As a response to said feedback signals ($_{612} 121_{613}$), and said PMS control signals ($_2 10_{613}$), the LPC furnishes (613) control signals ($_{613} 18_{611}$) to the prime mover (611) which drives the generator (612). The LPC (613) may also furnish LPC control signals ($_{613} 18_{612}$) directly to the generator (612) such as the desired magnetisation of the generator (612). The LPC (613) may further be arranged for receiving power distribution feedback signals ($_{90} 16_{613}$) pertaining to the state of said real or simulated power distribution network (90, 90'). The LPC (613) may as a response to said feedbacksignals ($_{90} 16_{613}$) provide approriate control signals, such as an increase or decrease of the magnetisation or speed of said generator (613). An example of a situation which may be tested for is a situation in which one or more generators (612) are malfunctioning, the remaining generators are functioning at near to full capacity, and a sudden and acute need for additional thruster power arises. The PMS (2) will then be required to take appropriate action as to which power consuming systems should receive less power, in order for additional power to be provided to the thrusters. If a marine vessel needs to be rapidly displaced from a given position in order to avoid a collision, then the thruster systems should be given a higher priority than e.g. cabin lighting, cranes or cooling machinery on board. It is critical that the PMS is able to respond appropriately to such situations.

In another preferred embodiment of the invention one or more said power management subsystems ($2_1, 2_2, \ldots$) are arranged for furnishing control signals (2117) to one or more of said real and/or simulated power consuming systems (7,7'). As described above, said control signals ($_2 11_7$) comprise amongst others thruster shutdown signals or fast load reduction signals.

In a further preferred embodiment of the invention, one or more of said power management subsystems ($2_1, 2_2, \ldots$) may receive feedback signals from one or more of said real or simulated local power controllers (613,613'). Said power management subsystems ($2_1, 2_2, \ldots$) may be arranged for receiving feedback signals pertaining to the overall state of one or more of said power generation subsystems ($6_1, 6_2, \ldots$)

In a particularity preferred embodiment of the invention, said real DP system (3) is connected to the PMS (2) and the simulator (120) and will furnish control signals ($_3 8_7$) to said real and/or simulated power consuming system (7,7') which will respond by furnishing signals to the PMS (2) as described above. Said simulator (120) comprises one or more of a simulated power generation subsystems ($6_1', 6_2', \ldots$), a simulated thruster system (7') and a simulated vessel (1'). The DP control system (3) furnishes control signals ($_3 8_{7'}$) to the simulated thruster system (7'). As a response to said control signals ($_3 8_{7'}$), the simulated thruster system (7') furnishes simulated signals ($_7 9_2'$) to the real PMS (2). The PMS (2) furnishes power command signals ($_2 10_{6'}$) to a simulated power generation system (6') which in turn furnishes simulated power ($_6 P_{7'}'$) to said simulated power consuming system (7'). Said simulated power consuming system (7') provides forces ($_7 F_{1'}'$) influencing said simulated vessel (1'). The simulated vessel (1') motion may be influenced by simulated enviromental loads ($_E F_1'$) or real simultaneaous or recorded enviromental loads ($_E F_1$). The resulting simulated vessel motion is measured or calculated, and the resulting motion is communicated as simulated (5') signals to the DP system (3). The PMS (2) may furnish PMS feedbacksignals ($_2 13_3$) to the DP system (3). The PMS (2) may further receive simulated power generation feedback signals ($_6 12_2'$) from said simulated power generation system (6'). The PMS (2) may also as described above if necessary furnish control signals ($_2 11_{7'}$) directly to the simulated power consuming system (7'). In a preferred embodiment of the invention, said real or simulated power consuming system (7,7') is further arranged for furnishing power consumption feedback signals ($_7 14, 14_3'$) to the DP system (3) pertaining to the state of the power consuming system (7). Such feedbacksignals (14) may comprise amongst others revolution speed, propeller pitch, shaft speed etc. In a further preferred embodiment of the invention, said PMS (2) or one or more of said power management subsystems ($2_1, 2_2, \ldots$) may be arranged for providing power management system feedback signals ($_2 13_3$) to said DP system (3). Such signals may pertain to the overall state of the power system. It is important to note that all real systems in the simulation loop are unable to distinguish between real and simulated signals. It is thus of no practical importance for the real systems whether the signals furnished to them result from the computations of a simulator, or from actual measurements made by real sensors.

Referring now to FIG. 12, in a separate preferrred embodiment of the invention, the real and or simulated power consuming system (7,7') is considered to be a thruster system (7)

now comprising a real local thruster controller (711) to be included in the test system, and a simulated propulsion unit (710') and possibly a real propulsion unit (710),to be run cocurrently. Said real and/or simulated propulsion unit (710, 710') may e.g. be a fixed pitch variable speed thruster (FIG. 5a) in which one connects the local thruster controller to the simulator (120). The object of this particular embodiment of the invention is to enable testing of the interactions between said real local thruster controller (711), said real DP system (3) and said real PMS (2). Thus, the DP system (3) furnishes signals ($3_8 711$) to said local thruster controller (711) which, as a response to said signals ($_{711}9_2$), furnishes control signals ($_2 10_6$) to said PMS (2). Said PMS (2) will respond by furnishing control signals ($_2 10_6$) to the real and/or simulated power generation system (6,6') which in turn responds to said signals ($_2 10_6$) by providing power to said real and/or simulated propulsion unit (710,710'). In this embodiment of the invention one is thus able to the response of the three interconnected logical decision units: the DP system (3), the PMS (2) and the local thruster controller (711) to a simulated power consumption situation.

Said local thruster controller (711) is in a preferred embodiment of the invention arranged for providing control signals ($_{711}172_{710}$) to said real and/or simulated propulsion unit (710,710'), such as signals pertaining to shaft speed, propeller pitch etc. The real and/or simulated propulsion unit provides feedback signals (15) to said local thruster controller (711) and/or said DP system (3) describing the state of said propulsion system (710). The DP system is further arranged for receiving real and/or simulated feedback signals (5, 5') from said real and/or simulated vessel (1,1') pertaining to the state of the vessel (1, 1'). The vessel (1,1') may also be influenced by real and/or simulated enviromental loads, such as waves, currents, wind etc as described above. Thus the DP system (3) responds to said feedback signals (15) from said propulsion unit (710,710'), to feedback signals ($_2 13_3$) from said PMS (2) and to feedback signals ($_1 5_3$) from said vessel (1,1'). Said DP system (3) will as a response to said signals , and to possible command signals (41) furnished from a command console (4) furnish control signals ($_3 8_{711}$) to said local thruster controller (711), which will initiate a similar signal loop to the one described above. The PMS (2) or one or more of said power management subsystems ($2_1, 2_2, \ldots$) are in a preferred embodiment of the invention arranged for furnishing control signals ($_3 11_{711}$) such as fast load reduction signals to said local thruster controller (711).

In a particular embodiment of the invention said local thruster controller (711) is arranged for furnishing local thruster controller feedback signals (171) to said dynamic positioning system (3).

In a preferred embodiment of the invention, some or all of the signals to and from the tested units are logged on a data logger (130), and stored for later analysis. A test conducted according to the method and system of the invention and said analysis may result in the approval or rejection of one or more of the tested units: the PMS (2), the DP (3), or the local thruster controller (711) and may also discover disadvantages of the power system as a whole.

COMPONENT LIST

1 Vessel
1' Simulated vessel
2 Power Management System
$2_1, 2_2, \ldots, 2_n$ Power management subsystems
3 Command system
4 command input device
41 command input signals
5 sensors
5' simulated sensors
51 sensor signals
51' simulated sensor signals
6 power generation systems
6' simulated power generating systems
$6_1, 6_2, \ldots, 6_n$ power generating subsystems
61', 62', . . . simulated power generating subsystems
611 Prime Mover
612 Generator
613 Local power control (LPC)
614 Governor
615 Automatic Voltage Regulator
7 thruster system
7' simulated thruster system
$7_1, 7_2, \ldots$ thruster subsystems
$7_1', 7_2', \ldots$ simulated thruster subsystems
710 propulsion unit
710' simulated propulsion unit
711 Local Thruster control (LTC)
712 power electronics VSD
713 motor
714 shaft
715 motor starter
716 Pitch servo
717 Propeller
8 command signals
8' simulated command signals
9 signals, sensor signals or control signals from power consuming system (7,7') to PMS (2)
9' simulated signals, simulated sensor signals or control signals from power consuming system (7,7') to PMS (2)
10 PMS control signals
11 fast load reduction signals to thruster
12 power generation feedback signals
12' simulated power generation feedback signals
121 generator feedback signals
13 PMS feedbacksignals
14 power consumption feedback signals
14' simulated power consumption feedback signals
15 Propulsion feedback signals
15' simulated propulsion feedback signals
16 power distribution feedback signals
17 PMS control signals to power network
18 Local power control (LPC) control signals
19 LPC feedback signals
161 generator feedback signals
171 local thruster controller feedback signals
172 local thruster controller control signals
90 electrical power grid
91 power switches
92 bus tie breaker
100 I/O connectors
120 simulator
130 logger
P,P' Simulated or real power
F,F' Simulated or real forces or moments.

The invention claimed is:

1. A system for testing a power management system (2) of a marine
vessel (1), in which said power management system (2) is arranged for controlling systems (6) that produce electrical energy, in which said power management system (2) is arranged for receiving first signals (9) from a power consuming system (7), in which said power management system (2) as a response to said first signals (9)

is arranged for furnishing second control signals (10) to a power generation system (6) arranged for furnishing power (P) to said power consuming system (7), characterized by a simulator (120) arranged for being connected to said power management system (2), said simulator (120) including a simulated power consuming system (7') arranged for receiving real and/or simulated control signals (8, 8') pertaining to a desired state of said simulated power consuming system (7'), a simulated power generation module (6') arranged for furnishing simulated power (P') to said simulated power consuming system (7'), said simulated power consuming system (7') arranged for furnishing simulated signals (9') to said power management system (2), said power management system (2) arranged for furnishing control signals (10) to said simulated power generation system (6') as a response to said simulated signals (9'), said simulated power generation system (6') arranged for providing simulated power (P') to said simulated power consuming system (7') as a response to said control signals (10), for the functional, performance or failure mode testing of said power management system (2).

2. The system according to claim 1, in which said first sensor signals comprise control signals (9) and/or sensor signals (9).

3. The system according to claim 1, comprising a dynamic positioning system (3) arranged for furnishing command signals (8) to said real and/or simulated power consuming system (7, 7'), and further arranged for receiving commands (41) from a command console (4) pertaining to the overall state of said vessel (1).

4. The system according to claim 1 in which said simulator (120) further comprises a vessel module (1') comprising an algorithm arranged for computing the dynamic behavior of said simulated vessel (1') when said simulated vessel (1') is subject to simulated environmental loads and said forces (F') from said simulated power consuming system (7').

5. The system according to claim 4, said simulator (120) further comprising a simulated vessel (1'), said simulated power consuming system (7') comprising a thruster system (7'a) arranged for providing simulated forces (F') to said simulated vessel (1').

6. The system according to claim 2, in which said dynamic positioning system (3) being arranged for receiving signals (5') from said simulated vessel (1') pertaining to the state of said simulated vessel (1'), and as a response to said signals (5') furnish command signals (8) to said simulated power consuming system (7').

7. The system according to claim 1 in which said power management system (2) comprises two or more power management subsystems ($2_1, 2_2, \ldots$).

8. The system according to claim 6 in which one or more of said power management subsystems ($2_1, 2_2, \ldots$) being interconnected with one or more of other said power management subsystems ($2_1, 2_2, \ldots$).

9. The system according to claim 1, in which said power management subsystems ($2_1, 2_2, \ldots$) being arranged on separate locations on board said marine vessel (1).

10. The system according to claim 1, in which one or more of said power management subsystems ($2_1, 2_2, \ldots$) being arranged for furnishing control signals (17) to one or more switches or tie breakers (91, 92) on said electrical power distribution grid (90) of said marine vessel (1).

11. The system according to claim 1, in which said real and simulated power generation system (6, 6') comprises one or more separate real and simulated power generation subsystems ($6_1, 6_1', 6_2, 6_2', \ldots$).

12. The system according to claim 1, in which one or more of said power management subsystems ($2_1, 2_2, \ldots$) being arranged for providing signals (9) to one or more of said real and/or simulated separate power generation subsystems ($6_1, 6_1', 6_2, 6_2', \ldots$).

13. The system according to claim 1, in which said power management subsystem ($2_i$) is arranged for providing signals (9) to a corresponding real or simulated power generation subsystem ($6_i, 6_i'$).

14. The system according to claim 1, in which one or more of said power management subsystems ($2_1, 2_2, \ldots$) being arranged for furnishing power management subsystem control signals (11) such as so-called fast load reduction signals (11) to said real or simulated power consuming system (7,7').

15. The system according to claim 1, in which one or more of said real and said simulated power generation subsystems ($6_1, 6_1', 6_2, 6_2', \ldots$) comprises one or more of the following:

a real prime mover (611), a real generator (612), a real local power controller (613), a simulated prime mover (611'), a simulated generator (612'), a simulated local power controller (613').

16. The system according to claim 1, in which said simulated or real local power controller ($613_1, 613_1', 613_2, 613_2', \ldots$) is arranged for receiving power management control signals (10) from said power management system (2) and/or said power management subsystem ($2_1, 2_2, \ldots$), and is further arranged for furnishing local power controller control signals (18) to a corresponding real or simulated prime mover ($611_1, 611_1', 611_2, 611_2', \ldots$) such as desired revolution speed ,and/or a real or simulated Generator ($612_1, 612_1', 612_2, 612_2', \ldots$). such as desired generator magnetization.

17. The system according to claim 1, in which said real or simulated local power controller (613, 613') is arranged for receiving generator feedback signals (121) from said one or more simulated or real generators ($612_1, 6l2_1', 612_2, 612_2', \ldots$), and is further arranged for receiving power distribution feedback signals (16) from said one or more real or simulated power grids (90, 90').

18. The system according to claim 1 in which said real or simulated local power controller (613, 613') is arranged for furnishing local power controller feedback signals (16) to one or more of said power management subsystems ($2_1, 2_2, \ldots$).

19. The system according to claim 1, in which one or more of said real or simulated power generation subsystems ($6_1, 6_1', 6_2, 6_2', \ldots$) is arranged for furnishing real or simulated power generation feedback signals (12,12') to one or more of said power management subsystems ($2_1, 2_2, \ldots$).

20. The system according to claim 1, in which one or more of said real and simulated electrical grids (90, 90') is arranged for furnishing real and simulated power distribution feedback signals (16,16'), such as voltage signals, respectively to one or more of said power management subsystems ($2_1, 2_2, \ldots$).

21. The system according to claim 1, in which said power management system (2) being arranged for furnishing power management system feedback signals (13) to said dynamic positioning system (3).

22. The system according to claim 1, in which said power consuming system (7') being arranged for furnishing power consumption feedback signals (14') to said dynamic positioning system (3).

23. The system according to claim 1, in which said power consuming unit (7) comprises a local thruster controller (711) and a real and/or simulated propulsion unit (710,710').

24. The system according to claim 1, in which said local truster controller (711) is arranged for furnishing signals (9) to said one or more of power management system (2) and/or power management subsystems ($2_1, 2_2, \ldots$).

25. The system according to claim 1, in which said local truster controller (711) is arranged for receiving control signals (11) such as fast load reduction signals (11) from one or more of said power management system (2) and/or power management subsystems ($2_1, 2_2, \ldots$).

26. The system according to claim 1, in which said local thruster controller (711) is arranged for receiving command signals (8) from said dynamic positioning system (3).

27. The system according to claim 1, in which said local thruster controller (711) is arranged for furnishing local thruster controller control signals (172) to said simulated or real propulsion system (710, 710').

28. The system according to claim 1, in which said real or simulated propulsion unit (710, 710') is arranged for furnishing propulsion feedback signals (15, 15') to said local thruster controller (711) and/or said dynamic positioning system (3).

29. The system according to claim 1, in which one or more of the signals to and from the tested system or systems are logged on a logger (130).

30. A method for testing the power management system (2) of a marine
vessel (1), in which said power management system (2) controls electrical energy generation systems (6), in which said power management system (2) receives first signals (9) from a power consuming system (7), and as a response to which said power management system (2) furnishes second control signals (10) to a power generation system (6) furnishing power (P) to said power consuming system (7), characterized by
connecting a simulator (120) to said power management system (2),
said simulator (120) providing simulated control signals (8') pertaining to a desired state of a simulated power consuming system (7') to said simulated power consuming system (7') or an external system (3) providing real control signals (8) pertaining to said desired state of said simulated power consuming system (7'),
said simulator (120) comprising a simulated power generation module (6') furnishing simulated power (P') to said simulated power consuming system (7'),
said simulated power consuming system (7') providing simulated signals (9') to said power management system (2),
said power management system (2) furnishing control signals (10) to said simulated power generation system (6') as a response to said simulated signals (9'),
said simulated power generation system (6') providing simulated power (P') to said simulated power consuming system (7') as a response to said control signals (10),
for the functional, performance or failure mode testing of said power management system (2).

31. The method according to claim 30, using a dynamic positioning system (3) for furnishing command signals (8) to said real and/or simulated power consuming system (7, 7'), and for receiving commands (41) from a command console (4) pertaining to the overall state of said vessel (1).

32. The method according to claim 30, said simulator (120) further comprising a simulated vessel (1'), said simulator (120) providing simulated forces (F') to said simulated vessel (1') from a simulated power consuming system (7') being a thruster system (7'), said simulated vessel (1') comprising an algorithm computing the dynamic behavior of said simulated vessel (1') when said simulated vessel (1') is subject to simulated environmental loads and said forces (F') from said simulated power consuming system (7').

33. The method according to claim 30, in which said power management
system (2) is disconnected from said power consuming system (7) and said power generation system (6).

34. The method according to claim 30, in which said power management system (2) functions as a distributed power management system (2), in which said power management system (2) comprises one or more power management subsystems ($2_1, 2_2, \ldots$).

35. The method according to claim 30, in which said dynamic positioning system (3) receives signals (5') from said simulated vessel (1') pertaining to the state of said vessel (1'), and as a response to said signals (5') furnishes command signals (8) to said simulated power consuming system (7') pertaining to a desired state of said simulated vessel (1'), such as desired vessel speed, heading, position, shaft speed.

36. The method according to claim 30, in which one or more of said power management subsystems ($2_1, 2_2, \ldots$) provides control signals (17) for opening or closing one or more switches or tie breakers (91, 92) on said electrical power distribution grid (90) of said marine vessel (1).

37. The method according to claim 30, in which said real and simulated power generation system (6, 6') functions as one or more separate real and simulated power generation subsystems ($6_1, 6_1', 6_2, 6_2', \ldots$).

38. The method according to claim 30, in which one or more of said power management subsystems ($2_1, 2_2, \ldots$) provides signals (9) to one or more of said real and/or simulated separate power generation subsystems ($6_1, 6_1', 6_2, 6_2', \ldots$).

39. The method according to claim 30, in which said power management subsystem ($2_i$) provides signals (9) to a corresponding real or simulated power generation subsystem ($6_i, 6_i'$).

40. The method according to claim 30, in which one or more of said power management subsystems ($2_1, 2_2, \ldots$) furnishes power management subsystem control signals (11) such as so-called fast load reduction signals (11) to said real or simulated power consuming system (7,7').

41. The method according to claim 30, in which one or more of said power generation subsystems ($6_1, 6_1', 6_2, 6_2', \ldots$) includes one or more of the following:
a prime mover (611)
a generator (612)
a local power controller (613), said method comprising
running a simulated prime mover (611'),
running a simulated generator (612'),
running said real or a simulated local power controller (613, 613').

42. The method according to claim 30, in which said simulated or real local power controller ($613_1, 613_1', 613_2, 613_2', \ldots$) receives power management control signals (10) from said power management system (2) and/or a power management subsystem ($2_1, 2_2, \ldots$), and further furnishes local power controller control signals (18) to a corresponding real or simulated prime mover ($611_1, 611_1', 611_2, 611_2', \ldots$) and/or a real or simulated Generator ($612_1, 612_1', 612_2, 612_2', \ldots$).

43. The method according to claim 30, in which said real or simulated local power controller (613, 613') receives generator feedback signals (161) from said one or more simulated or real generators (612$_1$, 612$_1$', 612$_2$, 612$_2$', ...) and/or power distribution feedback signals (16) from said one or more real or simulated power grids (90, 90').

44. The method according to claim 30, in which one or more of said real or simulated power generation subsystems (2$_1$,2$_2$, ...) furnishes power management control system signals (10) to one or more of said real or simulated power consuming systems (7,7').

45. The method according to claim 30 in which one or more of said real or simulated power generation subsystems (6$_1$, 6$_1$', 6$_2$, 6$_2$', ...) furnishes real or simulated power generation feedback signals (12,12') to one or more of said power management subsystems (2$_1$,2$_2$, ...).

46. The method according to claim 30, in which said power management system (2) furnishes power management system feedback signals (13) to said dynamic positioning system (3).

47. The method according to claim 30, in which said power consuming system (7') furnishes power consumption feedback signals (14') to said dynamic positioning system (3).

48. The method according to claim 30, in which said power consuming unit (7) comprises a local thruster controller (711) and a real or simulated propulsion unit (710,710').

49. The method according to claim 30, in which said local truster controller (711) furnishes local thruster controller command signals (172) to one or more of said power management system (2) and/or power management subsystems (2$_1$,2$_2$, ...).

50. The method according to claim 30, in which said local truster controller (711) receives real or simulated signals (9) from one or more of said power management system (2) and/or power management subsystems (2$_1$,2$_2$, ...).

51. The method according to claim 30, in which said local truster controller (711) is furnishes local thruster controller feedback signals (171) to said dynamic positioning system (3).

52. The method according to claim 30, in which said local truster controller (711) receives command signals (8) from said dynamic positioning system (3).

53. The method according to claim 30, in which said local truster controller (711) furnishes local thruster controller control signals (172) to said simulated or real propulsion system (710,710').

54. The method according to claim 30, in which said real or simulated propulsion unit (110, 110') furnishes propulsion feedback signals (15, 15') to said local thruster controller (711) and/or said dynamic positioning system (3).

55. The method according to claim 30, in which some or all of the signals to and from some or all of the tested systems are logged on a data logger (130).

* * * * *